(12) United States Patent
Halstead

(10) Patent No.: US 10,370,541 B2
(45) Date of Patent: Aug. 6, 2019

(54) EMULSION-BASED LATEX AEROSOL PAINT

(71) Applicant: The Sherwin-Williams Company, Cleveland, OH (US)

(72) Inventor: Joshua Halstead, Parma, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 67 days.

(21) Appl. No.: 15/463,634

(22) Filed: Mar. 20, 2017

(65) Prior Publication Data
US 2017/0267868 A1 Sep. 21, 2017

Related U.S. Application Data

(60) Provisional application No. 62/310,451, filed on Mar. 18, 2016, provisional application No. 62/314,467, filed on Mar. 29, 2016.

(51) Int. Cl.
*C09D 5/00* (2006.01)
*C09D 5/02* (2006.01)
*C09D 7/20* (2018.01)
*C09D 7/45* (2018.01)

(52) U.S. Cl.
CPC ............ *C09D 5/021* (2013.01); *C09D 5/027* (2013.01); *C09D 7/20* (2018.01); *C09D 7/45* (2018.01)

(58) Field of Classification Search
CPC . C09D 5/021; C09D 7/20; C09D 7/45; C09D 5/027; C09D 5/00; C09D 5/02; C09D 7/001
USPC ........................................................ 524/223
See application file for complete search history.

(56) References Cited

U.S. PATENT DOCUMENTS

| | | | | |
|---|---|---|---|---|
| 4,014,841 | A * | 3/1977 | Taub | C09D 5/021 524/249 |
| 4,240,940 | A * | 12/1980 | Vasishth | C09D 5/021 524/376 |
| 4,265,797 | A | 5/1981 | Suk | |
| 4,365,028 | A | 12/1982 | Leep et al. | |
| 4,384,661 | A * | 5/1983 | Page | C09D 5/021 222/394 |
| 5,988,455 | A | 11/1999 | Pearson et al. | |
| 2008/0161480 | A1* | 7/2008 | Perumal | C08F 255/00 524/539 |

OTHER PUBLICATIONS

Triton CF-10 Surfactant, product information brochure, 2009, 2 pages, Dow Chemical Company.

* cited by examiner

*Primary Examiner* — Hannah J Pak
(74) *Attorney, Agent, or Firm* — Hahn Loeser & Parks LLP; John J. Cunniff

(57) ABSTRACT

An emulsion-based latex aerosol paint comprises 5-50 weight percent of one or more hydrocarbon solvents, 0.05-10 weight percent of a surfactants with a Hydrophilic-Lipophilic Balance value of 4-10, 10-70 weight percent of a water-based coating emulsified into a mixture of the one or more solvents and the one or more surfactants. The emulsion-based latex aerosol paint may be additionally charged with a hydrocarbon propellant at a level of 5 to 50 weight percent. The hydrocarbon propellant may be selected from propane, butane, isobutene and mixtures thereof. A method of making an emulsion-based latex aerosol paint comprises providing one or more aliphatic solvents, adding one or more surfactants to the one or more aliphatic solvents to provide a solvent/surfactant mixture, adding a water-based coating to the solvent/surfactant mixture and emulsifying the water based coating in the solvent surfactant mixture to provide a water-based coating emulsion, and placing the water-based coating emulsion in a delivery system utilizing a hydrocarbon propellant.

9 Claims, No Drawings

EMULSION-BASED LATEX AEROSOL PAINT

CROSS REFERENCE TO RELATED APPLICATIONS

This application claims benefit of pending U.S. Provisional Application No. 62/310,451 filed on Mar. 18, 2016 and pending U.S. Provisional Application No. 62/314,467 filed on Mar. 29, 2016, the disclosures of which are incorporated by reference herein.

BACKGROUND OF THE INVENTION

The invention relates to aerosol coatings, particularly to an aerosol paint product. Even more particularly, the present invention relates to an aerosol latex paint and a method of manufacturing the same utilizing the same base paint as existing architectural products.

The use of paint in architectural applications is well known. Paints for these applications may be divided into oil-based paints and water-based or "latex" paints. These paints may be further divided into paints for exterior applications and those for interior applications. Architectural paint for interior applications is frequently water-based or latex paint, due to the ease of use and the fact that clean up requires water rather than mineral spirits or other organic solvents.

The use of water as a solvent however, has previously made the use of latex paint incompatible with most aerosol spray applications, due to the insolubility of the hydrocarbon propellants typically used in an aerosol spray paint application, such as propane, butane, or isobutene, in water. The use of partially water soluble gasses such as dimethyl ether is known in some limited aerosol applications, however when dimethyl ether is used with latex polymers the gas penetrates and swells the micelle resulting in a highly viscous non-sprayable gel.

It has been known to use water emulsified into a solvent based solution coating in ground marking/striping paint in the past. In such applications, water serves only as filler for cost reduction and does not involve a fully formulated, water-based coating emulsified into a carrier solvent. When water is added to a solvent-based coating it may introduce many problems such as: polymer insolubility, long dry times, poor film properties, high VOC, etc.

Therefore, there is a need for an aerosol latex paint in which a water-based coating is emulsified into a carefully chosen, controlled blend of solvents such that one is able to maintain the original properties and advantages of a modern latex coating. Such a product would provide an excellent touch-up tool over brushed or rolled architectural paint as well as a means to spray a latex coating without the use of bulky and expensive equipment.

BRIEF SUMMARY OF THE INVENTION

It is therefore, an aspect of the present invention to provide a latex aerosol paint.

In general, the present invention allows hydrocarbon-based propellants to be used with a water-based coating by providing an emulsion of a water-based coating and organic solvent (water in oil) into which hydrocarbon propellant can easily dissolve. While prior hydrocarbon propellants, such as propane/butane, are not soluble enough in water to function as a viable aerosol propellant, nor can propane/butane be emulsified directly into water, the use of the present emulsion of a water-based coating and organic solvent permits the hydrocarbon solvent to be used to create an aerosol latex paint.

The emulsion-based latex aerosol paint comprises 5 percent-50 percent by weight of one or more hydrocarbon solvents, 0.05 percent and 10 percent by weight of a surfactants with a Hydrophilic-Lipophilic Balance value of 4-10, 10 percent and 70 percent by weight of a water-based coating emulsified into a mixture of the one or more solvents and the one or more surfactants. The emulsion-based latex aerosol paint may be additionally charged with a hydrocarbon propellant at a level of 5 to 50 percent by weight. The hydrocarbon propellant may be selected from propane, butane, isobutene, and mixtures thereof.

The claimed invention also includes a method of making an emulsion-based latex aerosol paint. The method comprises providing one or more hydrocarbon solvents, adding one or more surfactants to the one or more hydrocarbon solvents to provide a solvent/surfactant mixture, adding water-based coating to the solvent/surfactant mixture and emulsifying the water-based coating in the solvent surfactant mixture to provide a water-based coating emulsion, and placing the water-based coating emulsion in a delivery system utilizing a hydrocarbon propellant.

In the present invention, one or more hydrocarbon solvents are selected so that the resulting evaporation profile approximates the evaporation profile of the water-based paint to be used. A surfactant with an HLB (Hydrophilic-Lipophilic Balance) value of between 4-10 is included in the solvent mixture. The chosen water-based coating can then be emulsified into the solvent/surfactant mixture under agitation at a level between 10 percent and 70 percent by weight. The resulting emulsion may then be placed into an aerosol can and charged with hydrocarbon propellant at a level of 5 percent to 50 percent by weight.

DETAILED DESCRIPTION OF THE INVENTION

The present invention is directed toward an emulsion-based latex aerosol paint. The following examples should not be viewed as limiting the scope of the invention. The claims will serve to define the inventions.

In one embodiment, the invention may include the selection of an aliphatic solvent or a blend thereof that most closely matches the evaporation profile of the water-based paint that is to be emulsified at a usage level between 5 to 50 percent by weight. In one particular embodiment, the aliphatic solvent may be present at a level of 30 to 45 percent by weight. In one other particular embodiment the aliphatic solvent may be present at a concentration of approximately 35 percent by weight.

The appropriate surfactants with an HLB (Hydrophilic-Lipophilic Balance) value of between 4-10 are included in the solvent mixture. The surfactant usage level may be between 0.05 percent and 10 percent by weight. In some examples, this surfactant or emulsifier is present at a concentration of 0.05 to 3 percent by weight. In one particular embodiment, this surfactant is present at a concentration of approximately 1 percent by weight.

The chosen water-based coating can then be emulsified into the solvent/surfactant mixture under agitation at a level between 10 percent and 70 percent by weight. The resulting emulsion is then placed into an aerosol can and charged with hydrocarbon propellant at a level of 5 percent to 50 percent by weight or volume. The hydrocarbon propellant may consist of a propane/butane or propane/butane/isobutene blend.

The one or more hydrocarbon solvents may be aliphatic hydrocarbons, aromatic hydrocarbons, or a mixture thereof. Acceptable hydrocarbon solvents include those comprising C-5 to C-20 alkanes such as pentane, hexane, heptane, octane, and related hydrocarbons including their related isomers and mixtures thereof In some embodiments, the hydrocarbon solvent is a mixture of aliphatic and/or aromatic hydrocarbons such as Varnish Makers' & Painters' (VM & P) Naphtha or mineral spirits. Mineral spirits are petroleum distillates and may contain, for example, hexane, approximately 65 percent or more C10 or higher hydrocarbons and up to 25 percent C-7 to C-12 aromatic hydrocarbons. VM & P Naphtha is a mixture of petroleum distillates, chiefly pentanes and hexanes. Supplemental n-hexane may also be added to control the evaporation profile of the composition upon application, as provided more fully below.

As stated above, the present invention includes one or more hydrocarbon solvents that are selected so that the resulting evaporation profile approximates the evaporation profile of the water-based paint to be used. In one embodiment, the evaporation profile may be measured by the following method. The evaporation rate of water and a solvent is determined relative to the evaporation rate of n-butyl acetate. The evaporation rate of n-butyl acetate is assigned a value of 1. The amount of each component in the formulation is divided by its relative evaporation rate to obtain a value for each component. Optimally, the value for water is greater than the value for the solvent(s). For example, in a composition containing 40 percent total water, 5 percent Mineral Spirits and 10 percent VM & P Naphtha, the calculations would be made as follows:

Water: 40/0.36=111.2

Mineral Spirits: 5/0.12=41.6

VM & P Naphtha: 10/1.6=6.25

Further adjustments in the composition may be necessary to account for factors such as product viscosity.

In various embodiments, the evaporation profile of the solvent or solvent blend used may be within 40 percent of the evaporation profile of the water-based paint. In other embodiments, the evaporation profile of the solvent or solvent blend used may be within 10 percent of the evaporation profile of the water-based paint. In further embodiments, the evaporation profile of the solvent or solvent blend used may be within 5 percent of the evaporation profile of the water-based paint. In still other embodiments, the evaporation profile of the solvent or solvent blend used may be within 2 percent of the evaporation profile of the water-based paint.

Suitable solvents include VM & P Naphtha, mineral spirits, pentane, hexane, heptane, octane, and other hydrocarbons ranging from C-5 to C-20 and their related isomers and mixtures thereof In some embodiments, the aliphatic solvent may be VM & P Naphtha, present in the composition at a concentration up to about 40 percent by weight or volume. In one example, VM & P Naphtha is present at a concentration of between about 4.5 percent and about 17 percent by weight or by volume. In addition or in the alternative, mineral spirits may be present in the composition at a concentration up to about 20 percent by weight or volume, such as between about 5 percent and about 20 percent by weight or by volume. In other examples, the total solvent concentration is between 30 and 45 percent by weight. In such an example, the solvent may comprise 0 to 20 percent by weight mineral spirits, 0 to 40 percent by weight VM &P Naphtha, and 0 to 20 percent by weight n-hexane. In one particular example, the solvent may comprise 10 percent by weight mineral spirits, 20 percent by weight VM &P Naphtha, and 5 percent by weight n-hexane. In another particular example, the solvent consists of 10 percent by weight mineral spirits, 20 percent by weight VM &P Naphtha, and 5 percent by weight n-hexane.

The composition also includes one or more surfactants with an HLB value of between 4-10, at a concentration between 0.05 percent and 10 percent by weight or volume. In some examples, the surfactant is present at a concentration between 0.05 percent and 3 percent by weight or volume. Examples of suitable surfactants include but are not limited to Tergitol NP-4, Schercodine S, Amadol 511 and Arquad 2C-75.

Thixotropic agents such as bentonite clays or similar minerals may also be included. Examples include Garamite 1958, Bentone SD-1, and BYK411.

Examples of the present invention were mixed and test sprayed as shown in Table 1.

TABLE 1

| Bulk Paint | Formula | Results of Formula |
| --- | --- | --- |
| Promar 200 Flat - Practical Biege & Kilim Biege | 40% Bulk Paint, 16% VM&P Naphtha, 17% Water, 1% Tergitol NP-4, 0.75% Garamite 1958, 0.25% BYK411 | Good color match, Stability 4 Months |
| Promar 200 - Practical Beige | 40% Bulk Paint, 16% VM&P Naphtha, 17% water, 1% Tergitol, 0.75% Schercodine P, 0.25% BYK411 | No Color Match attempted, Stability 10 Months and still going (sprayed once a month) |
| Promar 400 Flat - Practical Biege | 40% Bulk Paint, 15.25% Mineral Spirits, 17% Water, 1.25% Amadol 511, 1.25% Arquad 2C-75, 0.25% BYK411 | Stability 4 months until cans empty, Color match passable |
| Promar 400 Low Sheen - Nomadic Desert, A New Gray, Agreeable Gray, Balanced Beige, Tony Taupe | 40% Bulk Paint, 17% Water, 16% VM&P Naphtha, 1% Tergitol NP-4, 0.75% Garamite 1958, 0.25% BYK411 | Good Color Match, Stability 5 months |

TABLE 1-continued

| Bulk Paint | Formula | Results of Formula |
|---|---|---|
| Promar 400 Gloss - White | 40% Bulk Paint, 14.25% Mineral Spirits, 17% Water, 2% Tergitol NP-4, 0.25% Garamite 1958, 0.25% BYK411 | No Stability Data. |
| Promar 200 Semi-Gloss - Practical Biege | 32% Bulk Paint, 16% Mineral Spirits, 17.75% Water, 6.5% VM&P Naphtha, 2.5 Tergitol NP-4, 0.25% BYK411 | Stability 2 Months/ Separation(bubbling), Lost Gloss over time |
| Duration Int. Satin - Practical Biege | 32% Bulk Paint, 16% Mineral Spirits, 17.75% Water, 6.5% VM&P Naphtha, 1.25 Tergitol NP-4, 1.25% Amadol 511, 0.25% BYK411 | Good color match, Stability 4 months/ separation(bubbling), Kept Gloss |
| Duration Int. Matte - Practical Biege | 32% Bulk Paint, 16% Mineral Spirits, 17.75% Water, 6.5% VM&P Naphtha, 1.25 Tergitol NP-4, 1.25% Amadol 511, 0.25% BYK411 | Good color match, Stability 4 months/separation (bubbling) |
| Pulte Homes - Natural Choice | 40% Bulk Paint, 16% VM&P Naphtha, 17% Water, 1% Tergitol NP-4, 0.75% Garamite 1958, 0.25% BYK411 | Good color match, used in field testing |
| Pulte Homes - Natural Choice | 32% Bulk Paint, 22% Mineral Spirits, 18.75% Water, 1.25% Tergitol NP-4, 0.75% Garamite 1958, 0.25% BYK411 | Good color match, Stability 7 months |
| Super Paint Ext. Satin - Practical Biege & Adriatic Sea | 32% Bulk Paint, 19.25% Mineral Spirits, 21% Water, 1.25% Tergitol NP-4, 0.75% Garamite 1958, 0.50% Schercodine S, 0.25% BYK411 | Stability 2 Months Oven, Passable color match |
| Emerald Int. Satin - Practical Biege | 32% Bulk Paint, 18% Mineral Spirits, 22.75% Water, 1.25% Tergitol NP-4, 0.75% Garamite 1958, 0.25% BYK411 | Stability 9 Months Oven/ Viscosity increase/Very Textured, Lost Gloss over time, Passable color match |
| Resilience Gloss - Practical Biege | 32% Bulk Paint, 18.75% Mineral Spirits, 22% Water, 1.25% Tergitol NP-4, 0.75% Garamite 1958, 0.25% BYK411 | Good color match, Stability 4 months until separation due to viscosity increase, steady gloss throughout, showing texturing from month 3 on |
| Resilience Satin - Tricorn Black | 32% Bulk Paint, 18.75% Mineral Spirits, 22% Water, 1.25% Tergitol NP-4, 0.75% Garamite 1958, 0.25% BYK411 | No Stability Data, Troubleshooting Gloss Reduction, Good Spray otherwise. |
| Super Paint Int. Flat - Practical Biege | 40% Bulk Paint, 15% Mineral Spirits, 18% Water, 1.25% Amadol 511, 0.50% Arquad 2C-75, 0.25% BYK411 | Stability 2 Months Oven/ |
| Super Paint Ext. Flat - Practical Biege | 40% Bulk Paint, 14.25% Mineral Spirits, 18% Water, 1.25% Amadol 511, 1.25% Arquad 2C-75, 0.25% BYK411 | Stability 9 Months until empty, good color match |
| Super Paint Int. Semi-Gloss - Practical Biege | 40% Bulk Paint, 15.25% Mineral Spirits, 17% Water, 1.25% Amadol 511, 0.75% Garamite 1958, 0.50% Schercodine S, 0.25% BYK411 | 1 month of Stability/ |
| Promar 400 Semi-Gloss - Practical Biege | 40% Bulk Paint, 18% Mineral Spirits, 15% Water, 1.25% Amadol 511, 0.50% Arquad 2C-75, 0.25% BYK411 | 1 Week on Stability/ Separation |
| Promar 200 Satin - Practical Biege | 40% Bulk Paint, 15.25% Mineral Spirits, 17% Water, 1.25% Tergitol NP-4, 0.75% Garamite 1958, 0.50% Arquad 2C-75, 0.25% BYK411 | Good Color Match, Stability 3 Months/ |
| Promar 400 Egg Shell - Practical Biege | 40% Bulk Paint, 15.75% Mineral Spirits, 17% Water, 1.25 Tergitol NP-4, 0.75% Garamite 1958, 0.25% BYK411 | Stability 2 Months/Visc. Increase/Texturing Passable color match slightly darker |
| Emerald Ext. Satin - Practical Biege | 32% Bulk Paint, 16% Mineral Spirits, 17.75% Water, 6.5% VM&P Naphtha, 2.5% Tergitol NP-4, 0.25% BYK411 | Good Color Match, Stability 1 Month/Separation/ Bubbling |
| Duration Ext. Flat - White & Practical Beige | 32% Bulk Paint, 16% Mineral Spirits, 17.75% Water, 6.5% VM&P Naphtha, 1.25% Tergitol NP-4, 1.25% Amadol 511, 0.25% BYK411 | UV Test (White), Stability 1 Month/Separation (Practical Beige) |

TABLE 1-continued

| Bulk Paint | Formula | Results of Formula |
|---|---|---|
| Emerald Ext. Flat - White | 32% Bulk Paint, 16% Mineral Spirits, 17.75% Water, 6.5% VM&P Naphtha, 2.5% Tergitol NP-4, 0.25% BYK411 | UV Test, No Stability Data |
| Sherscrub Flat - Panda White & Kilim Beige | 40% Bulk Paint, 17% Water, 16% VM&P Naphtha, 1% Tergitol NP-4, 0.75% Garamite 1958, 0.25% BYK411 | Good color match, used in field testing |
| Pro-Classic Semi Gloss - White | 32% Bulk Paint, 18.25% Mineral Spirits, 21% water, 2% Tergitol NP-4, 0.25% Garamite 1958, 0.25% Byk411, 1% Texanol | Good color match, Stability 4 months |
| Pro Classic (Waterbased Alkyd) Semi-Gloss - White | 32% Bulk Paint, 18% Mineral Spirits, 21% water, 2% Tergitol NP-4, 0.50% Garamite 1958, 0.25% Byk411, 1% Texanol, 0.10% Cobalt Drier | 4 week stability then showing kickout |
| Eminence Flat Ceiling Paint - White | 40% Bulk Paint, 15.75% Mineral Spirits, 17% Water, 1.25 Tergitol NP-4, 0.75% Garamite 1958, 0.25% BYK411 | 3 months in stability, coverage slightly too light and spray too misty with vertical valve and actuator |
| Eminence Flat Ceiling Paint - White | 50% Bulk Paint, 10.50% Mineral Spirits, 12% Water, 1.25% Tergitol NP-4, 1% Garamite 1958, 0.25% BYK411 | No Stability Data, Used for field test. Better spray and less mist than above formula |
| Painters Edge Flat - Kilim Beige | 50% Bulk Paint, 12% VM&P Naphtha, 5% Mineral Spirits, 11% Water, 3% Tergitol NP-4, 1.25% Bentone SD-1, 0.75% BYK411 | 2 months in stability, great color match, used in marketing team demo |
| Painters Edge Flat - Cool Platinum | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Nomadic Desert | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Agreeable Gray | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Swiss Coffee | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painers Edge Flat - Macadamia | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Desert Fawn | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Sienna Sand | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Basketweave | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Botany Beige | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Lulled Beige | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Antique White | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |
| Painters Edge Flat - Bone White | 50% Bulk Paint, 12% VM&P Naphtha, 5% Mineral Spirits, 11% Water, 3% Tergitol NP-4, 1.25% Bentone SD-1, 0.75% BYK411 | Good color match, 2 months in stability, showing viscosity increase |

TABLE 1-continued

| Bulk Paint | Formula | Results of Formula |
|---|---|---|
| Painters Edge Flat - Cool Platinum | 45% Bulk Paint, 17% VM&P Naphtha, 5% Mineral Spirits, 3% Tergitol NP-4, 1% Garamite 1958, 0.50% Bentone SD-1, 0.25% BYK411, 11.25% water | Good color match, 1 months in stability, showing viscosity increase |
| Painters Edge Flat - Nomadic Desert | 45% Bulk Paint, 17% VM&P Naphtha, 5% Mineral Spirits, 3% Tergitol NP-4, 1% Garamite 1958, 0.50% Bentone SD-1, 0.25% BYK411, 11.25% water | Good color match, 1 months in stability, showing viscosity increase |
| Painters Edge Flat - Agreeable Gray | 45% Bulk Paint, 17% VM&P Naphtha, 5% Mineral Spirits, 3% Tergitol NP-4, 1% Garamite 1958, 0.50% bentone sd-1, 0.25% byk411, 11.25% water | Good color match, 1 months in stability, showing viscosity increase |
| Painters Edge Flat - Swiss Coffee | 45% Bulk Paint, 17% VM&P Naphtha, 5% Mineral Spirits, 3% Tergitol NP-4, 1% Garamite 1958, 0.50% Bentone SD-1, 0.25% BYK 411, 11.25% water | Good color match, 1 months in stability, showing viscosity increase |
| Painers Edge Flat - Macadamia | 45% Bulk Paint, 17% VM&P Naphtha, 5% Mineral Spirits, 3% Tergitol NP-4, 1% garamite 1958, 0.50% Bentone SD-1, 0.25% BYK 411, 11.25% water | Good color match, 1 months in stability, showing viscosity increase |
| Painters Edge Flat - Desert Fawn | 45% Bulk Paint, 17% VM&P Naphtha, 5% Mineral Spirits, 3% Tergitol NP-4, 1% garamite 1958, 0.50% Bentone SD-1, 0.25% BYK 411, 11.25% water | Good color match, 1 months in stability, showing viscosity increase |
| Painters Edge Flat - Sienna Sand | 45% Bulk Paint, 17% VM&P Naphtha, 5% Mineral Spirits, 3% Tergitol NP-4, 1% garamite 1958, 0.50% Bentone SD-1, 0.25% BYK 411, 11.25% water | Good color match, 1 months in stability, showing viscosity increase |
| Painters Edge Flat - Basketweave | 45% Bulk Paint, 17% VM&P Naphtha, 5% Mineral Spirits, 3% Tergitol NP-4, 1% garamite 1958, 0.50% Bentone SD-1, 0.25% BYK 411, 11.25% water | Good color match, 1 months in stability, showing viscosity increase |
| Painters Edge Flat - Botany Beige | 45% Bulk Paint, 17% VM&P Naphtha, 5% Mineral Spirits, 3% Tergitol NP-4, 1% Garamite 1958, 0.50% Bentone SD-1, 0.25% BYK 411, 11.25% water | Good color match, 1 months in stability, showing viscosity increase |
| Painters Edge Flat - Lulled Beige | 45% Bulk Paint, 17% VM&P Naphtha, 5% Mineral Spirits, 3% Tergitol NP-4, 1% Garamite 1958, 0.50% Bentone SD-1, 0.25% BYK 411, 11.25% water | Good color match, 1 months in stability, showing viscosity increase |
| Painters Edge Flat - Antique White | 45% Bulk Paint, 17% VM&P Naphtha, 5% Mineral Spirits, 3% Tergitol NP-4, 1% Garamite 1958, 0.50% Bentone SD-1, 0.25% BYK 411, 11.25% water | Good color match, 1 months in stability, showing viscosity increase |
| Painters Edge Flat - Bone White | 45% Bulk Paint, 17% VM&P Naphtha, 5% Mineral Spirits, 3% Tergitol NP-4, 1% Garamite 1958, 0.50% Bentone SD-1, 0.25% BYK 411, 11.25% water | Good color match, 1 months in stability, showing viscosity increase |
| Painters Edge Egg Shell - Kilim Beige | 45% Bulk Paint, 13 VM&P Naphtha, 7% Mineral Spirits, 12% water, 3% Tergitol NP-4, 1.25% Bentone SD-1, 0.75% BYK411, 1% Texanol | Good color match, 2 months in stability, showing viscosity increase, still spraying as of Jan. 4, 2016 |
| All Surface - Tricorn Black | 40% Bulk Paint, 15% Mineral Spirits, 18% Water, 1% Tergitol NP-4, 0.75% Garamite 1958, 0.25% BYK411 | 5 weeks stability still spraying, used for a field test |
| All Surface - Tricorn Black | 50% Bulk Paint, 12.5% Mineral Spirits, 4.5% VM&P Naphtha, 16% Water, 1% Tergitol NP-4, 0.75% Garamite 1958, 0.25% BYK411 | 5 weeks stability still spraying, used for a field test |

In another example of the invention, higher solvent levels and lower propellant levels were used. The viscosity of a water in oil emulsion is primarily controlled by the ratio of water phase to oil phase. As more water is added, the viscosity increases. While commercial products of this type have evolved to contain fewer organic compounds and more water, it has been advantageously found that when modern latex paint is emulsified into an aerosol at higher solvent levels, those higher solvent levels allow for a lower viscosity product. In turn, this will provide a finer mister spray, a more uniform coating, and a better user experience than a similar system with less solvents. In this example, the solvent level is between 30 and 45 weight percent of the composition. In one particular example, the composition is approximately 35 percent by weight solvent. Additionally, the inclusion of hexane as a supplemental component of the solvent phase, in addition to the hexane normally present in mineral spirits or VM & P Naphtha, can allow for enhanced control of the evaporation profile to maintain an ideal viscosity through the drying process.

Lower solvent level aerosols generally result in poor compatibility with semi-gloss and gloss paint. The reduced propellant level of the current example allows for the aerosol to be compatible with higher gloss sheens such as semi-gloss and gloss paints. When a water in oil emulsion is sprayed, the system is in a state of dynamic equilibrium in which water and solvent are evaporating concurrently. As previously mentioned, the viscosity is a function of the water to oil ratio and thus it will continue to change through the drying processes. Reducing the amount of hydrocarbon propellant, which immediately volatilizes, allows for the other solvents which have a slower rate of evaporation to remain in the film longer. This provides for better flow and leveling of the coating, which results in a smoother film with a better gloss response. In one example, the hydrocarbon propellant level is between 5 and 20 percent of the composition. In another example, the hydrocarbon propellant is present at a concentration of 15 percent by weight or less.

These examples of the present invention were mixed and test sprayed as shown in Tables 2 and 3.

TABLE 2

| HGTV Home Infinity by Sherwin Williams - Flat Sheen | Weight % | Results of Formula |
|---|---|---|
| Bulk Paint | 35 | Good color match, |
| Water | 14 | Heat stability good @ |
| VM&P Naphtha | 18.75 | 1 month. |
| Mineral Spirits | 10 | |
| Hexane | 5 | |
| Tergitol NP4 | 2 | |
| BYK 411 | 0.25 | |
| Propane Butane Propellant Blend | 15 | |

TABLE 3

| HGTV Home Infinity by Sherwin Williams - Satin Sheen | Weight % | Results of Formula |
|---|---|---|
| Bulk Paint | 35 | Good color match, |
| Water | 14 | Heat stability good |
| VM&P Naphtha | 17.75 | @ 1 month. |
| Texanol | 1 | |
| Mineral Spirits | 10 | |
| Hexane | 5 | |
| Tergitol NP4 | 2 | |
| BYK 411 | 0.25 | |
| Propane Butane Propellant Blend | 15 | |

Based upon the foregoing disclosure, it should now be apparent that the emulsion-based latex aerosol paint will carry out the aspects set forth hereinabove. It is, therefore, to be understood that any variations evident fall within the scope of the claimed invention and thus, the selection of specific component elements can be determined without departing from the spirit of the invention herein disclosed and described.

What is claimed is:

1. An emulsion-based latex aerosol paint comprising:
    25 percent to 45 percent by weight of a water-based coating emulsion;
    5 percent to 20 percent by weight of water;
    30 percent to 45 percent by weight of one or more hydrocarbon solvents;
    0.05 percent to 10 percent by weight of one or more surfactants with a Hydrophilic-Lipophilic Balance value of 4-10; and
    10 percent to 20 percent by weight of a hydrocarbon propellant.

2. The emulsion-based latex aerosol paint of claim 1, comprising 15 percent by weight of the hydrocarbon propellant.

3. The emulsion-based latex aerosol paint of claim 2, wherein the hydrocarbon propellant is selected from the group consisting of propane, butane, isobutene and mixtures thereof.

4. The emulsion-based latex aerosol paint of claim 2, wherein the one or more hydrocarbon solvents are selected from the group consisting of one or more aliphatic hydrocarbons, one or more aromatic hydrocarbons, and mixtures thereof.

5. The emulsion-based latex aerosol paint of claim 4, wherein the one or more aliphatic hydrocarbons comprise C-5 to C-20 alkanes.

6. The emulsion-based latex aerosol paint of claim 2, wherein the one or more hydrocarbon solvents are selected from the group consisting of VM & P Naphtha, mineral spirits, n-hexane, and mixtures thereof.

7. The emulsion-based latex aerosol paint of claim 6, comprising:
    35 percent by weight of the water-based coating emulsion;
    14 percent by weight of the water;
    35 percent by weight of the one or more hydrocarbon solvents selected from the group consisting of VM & P Naphtha, mineral spirits, n-hexane, and mixtures thereof;
    1 percent by weight of the one or more surfactants with a Hydrophilic-Lipophilic Balance value of 4-10; and
    wherein the water-based coating emulsion comprises latex paint.

8. The emulsion-based latex aerosol paint of claim 7, wherein the emulsion-based latex aerosol paint comprises 10 weight percent mineral spirits, 20 weight percent VM & P Naphtha and 5 weight percent n-hexane, to provide said 35 percent by weight of the one or more hydrocarbon solvents.

9. The emulsion-based latex aerosol paint of claim 1, comprising:
    35 percent by weight of the water-based coating emulsion;
    14 percent by weight of the water;
    35 percent by weight of the one or more hydrocarbon solvents;
    1 percent by weight of the one or more surfactants with a Hydrophilic-Lipophilic Balance value of 4-10; and
    15 percent by weight of the hydrocarbon propellant
    wherein the water-based coating emulsion comprises latex paint.

* * * * *